United States Patent
Liao et al.

(10) Patent No.: US 12,404,398 B2
(45) Date of Patent: Sep. 2, 2025

(54) RESIN COMPOSITION

(71) Applicant: NAN YA PLASTICS CORPORATION, Taipei (TW)

(72) Inventors: Te-Chao Liao, Taipei (TW); Wei-Ru Huang, Taipei (TW); Hung-Yi Chang, Taipei (TW); Chia-Lin Liu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 496 days.

(21) Appl. No.: 18/087,757

(22) Filed: Dec. 22, 2022

(65) Prior Publication Data

US 2024/0166859 A1 May 23, 2024

(30) Foreign Application Priority Data

Nov. 11, 2022 (TW) ................. 111143212

(51) Int. Cl.
| | |
|---|---|
| *C08L 47/00* | (2006.01) |
| *C08K 3/36* | (2006.01) |
| *C08K 7/18* | (2006.01) |
| *C08K 9/04* | (2006.01) |
| *C08L 77/00* | (2006.01) |

(52) U.S. Cl.
CPC ............... *C08L 47/00* (2013.01); *C08K 3/36* (2013.01); *C08K 7/18* (2013.01); *C08K 9/04* (2013.01); *C08L 77/00* (2013.01); *C08K 2201/003* (2013.01)

(58) Field of Classification Search
None
See application file for complete search history.

(56) References Cited

U.S. PATENT DOCUMENTS

| 10,240,015 | B2 * | 3/2019 | Kitai | ................ C08K 5/29 |
| 10,590,223 | B2 * | 3/2020 | Kitai | ................ H05K 1/0373 |
| 10,815,372 | B2 * | 10/2020 | Lee | ................ C08K 3/22 |
| 2015/0313012 | A1 * | 10/2015 | Chen | ................ C08K 5/5425 |
| | | | | 428/221 |
| 2017/0342264 | A1 * | 11/2017 | Jung | ................ C08K 5/0025 |
| 2022/0204746 | A1 * | 6/2022 | Ming | ................ C08J 5/246 |
| 2023/0099943 | A1 * | 3/2023 | Xu | ................ C08G 73/106 |
| | | | | 523/206 |
| 2024/0182613 | A1 * | 6/2024 | Storz | ................ C09D 125/02 |
| 2025/0136741 | A1 * | 5/2025 | Yamada | ................ C08F 290/06 |

FOREIGN PATENT DOCUMENTS

| CN | 111777541 A | * | 10/2020 | ......... C08G 59/4042 |
| CN | 113072885 A | * | 7/2021 | ............. C09J 11/08 |
| EP | 0322725 A1 | * | 7/1989 | ............. C08G 73/12 |
| JP | 2007262191 | | 10/2007 | |
| JP | 2021187893 | | 12/2021 | |
| JP | 2022508173 | | 1/2022 | |
| JP | 2022076516 | | 5/2022 | |
| TW | 202000784 | | 1/2020 | |
| TW | 202210584 | | 3/2022 | |
| TW | 202219151 | | 5/2022 | |
| WO | WO-2016175326 A1 | * | 11/2016 | ............... C08K 3/00 |
| WO | 2021112087 | | 6/2021 | |
| WO | 2021182207 | | 9/2021 | |
| WO | 2023047782 | | 3/2023 | |

OTHER PUBLICATIONS

Machine translation of WO-2016175326-A1, translation generated Jun. 2025, 35 pages. (Year: 2025).*
Machine translation of CN-113072885-A, translation generated Jun. 2025, 13 pages. (Year: 2025).*
Machine translation of CN-111777541-A, translation generated Jun. 2025, 12 pages. (Year: 2025).*
"Office Action of Taiwan Counterpart Application", issued on Nov. 23, 2023, p. 1-p. 4.
"Notice of allowance of Japan Counterpart Application", issued on Mar. 12, 2024, p. 1-p. 3.

* cited by examiner

Primary Examiner — Robert S Loewe
(74) Attorney, Agent, or Firm — JCIPRNET

(57) ABSTRACT

A resin composition is provided. The resin composition includes a resin mixture, a flame retardant, spherical silica and a siloxane coupling agent. The resin mixture includes a first resin polymerized by a monomer mixture comprising styrene, divinylbenzene and ethylene, a second resin polymerized by modified dicyclopentadiene diamine and maleic anhydride, and a SBS resin. The resin composition of the disclosure may have a high glass transition temperature and a low dielectric constant and a low dissipation factor after curing.

13 Claims, No Drawings

RESIN COMPOSITION

CROSS-REFERENCE TO RELATED APPLICATION

This application claims the priority benefit of Taiwan application serial no. 111143212, filed on Nov. 11, 2022. The entirety of the above-mentioned patent application is hereby incorporated by reference herein and made a part of this specification.

BACKGROUND

Technical Field

The disclosure relates to a resin composition, and in particular relates to a low dielectric constant resin composition.

Description of Related Art

Recently, with the development of 5G communication, the material of the copper foil substrate has been developed towards the goal of lower the dielectric constant. The dielectric constant of the current copper foil substrate is about 3.2 to 5.0, which is not conducive to the application of high frequency and fast transmission in the future. At present, attempts have been made to reduce the dissipation factor of the copper foil substrate by adding new low-dielectric constant resins such as polystyrene resins to the resin composition. However, the copper foil substrates prepared using such new low-dielectric constant resin also lowers the glass transition temperature while reducing the dissipation factor.

Based on the above, how to develop a low dielectric constant resin composition with a low dielectric constant, a low dissipation factor, and a high glass transition temperature (Tg) has become an urgent goal for those skilled in the art.

SUMMARY

The disclosure provides a low dielectric constant resin composition with a low dielectric constant, a low dissipation factor, and a high glass transition temperature (Tg).

The resin composition of the disclosure may include: a resin mixture, a flame retardant, spherical silica and a siloxane coupling agent. The resin mixture includes a first resin polymerized by a monomer mixture including styrene, divinylbenzene and ethylene, a second resin polymerized by modified dicyclopentadiene diamine and maleic anhydride, and a SBS resin.

In an embodiment of the disclosure, based on a total weight of the resin mixture, a content of the first resin is 30 wt % to 60 wt %, a content of the second resin is 20 wt % to 40 wt %, and a content of the SBS resin is 10 wt %. % to 30 wt %.

In an embodiment of the disclosure, based on 100 parts by weight of the resin mixture, an added amount of the spherical silica is 20 to 50 parts by weight.

In an embodiment of the disclosure, based on 100 parts by weight of the resin mixture, an added amount of the flame retardant is 10 to 50 parts by weight.

In an embodiment of the disclosure, based on 100 parts by weight of the resin mixture, an added amount of the siloxane coupling agent is 0.1 to 5 parts by weight.

In an embodiment of the disclosure, a molar ratio of styrene: divinylbenzene: ethylene in the monomer mixture is 1:1:1 to 2:2:1.

In an embodiment of the disclosure, a number average molecular weight of the first resin is 4500 to 6500.

In an embodiment of the disclosure, a weight average molecular weight of the second resin is 800 to 10,000.

In an embodiment of the disclosure, the SBS resin is polymerized by the monomer mixture comprising 5% to 40% styrene, 55% to 90% 1,2 butadiene and 5% to 30% 1.4 butadiene.

In an embodiment of the disclosure, a weight average molecular weight of the SBS resin is 3500 to 5500.

In an embodiment of the disclosure, the resin mixture further comprises polyphenylene ether resin.

In an embodiment of the disclosure, the spherical silica has acrylic or vinyl surface modification.

In an embodiment of the disclosure, an average particle diameter D50 of the spherical silica is 2.0 μm to 3.0 μm.

Based on the above, the resin composition of the disclosure combines the first resin polymerized by a monomer mixture including styrene, divinylbenzene and ethylene, the second resin polymerized by modified dicyclopentadiene diamine and maleic anhydride and the SBS resin, to achieve a low dielectric constant, a low dissipation factor, and a high glass transition temperature (Tg).

DETAILED DESCRIPTION OF DISCLOSED EMBODIMENTS

Embodiments of the disclosure will be described in details below. However, these embodiments are illustrative, and the disclosure is not limited thereto.

Herein, a range indicated by "one value to another value" is a general representation which avoids enumerating all values in the range in the specification. Therefore, the description of a specific numerical range covers any numerical value within the numerical range and the smaller numerical range bounded by any numerical value within the numerical range, as if the arbitrary numerical value and the smaller numerical range are written in the specification.

The resin composition of the disclosure includes a resin mixture, a flame retardant, spherical silica and a siloxane coupling agent. The resin mixture includes a first resin polymerized by a monomer mixture including styrene, divinylbenzene and ethylene, a second resin polymerized by modified dicyclopentadiene diamine and maleic anhydride, and a SBS resin. The above-mentioned components will be described in details below.

Resin Mixture

In this embodiment, the resin mixture may include a first resin polymerized by a monomer mixture including styrene, divinylbenzene and ethylene, a second resin polymerized by modified dicyclopentadiene diamine and maleic anhydride, and a SBS resin. The resin mixture may also include other resins, such as polyphenylene ether resin, as needed.

First Resin

In this embodiment, the first resin may be polymerized by a monomer mixture including styrene, divinylbenzene and ethylene. In the monomer mixture, the molar ratio of styrene:

divinylbenzene: ethylene in the monomer mixture may be 1:1:1 to 2:2:1. The number average molecular weight of the first resin may be 4500 to 6500. Based on the total weight of the resin mixture, the content of the first resin may be 30 wt % to 60 wt %. Adding the first resin to the resin composition may help reduce the dielectric constant of the resin.

Second Resin

In this embodiment, the second resin may be formed by condensation polymerization of modified dicyclopentadiene diamine and maleic anhydride, wherein the modified dicyclopentadiene diamine is formed by nitration and hydrogenation of dicyclopentadiene phenol resin. In the specification, the second resin may also be referred to as a modified maleimide resin. Based on the total weight of the resin mixture, the content of the second resin may be 20 wt % to 40 wt %. Because the main chain includes the structure of dicyclopentadiene, the second resin has good dielectric properties and heat resistance.

The second resin may be prepared as follows. First, the dicyclopentadiene phenol resin is subjected to a nitration reaction and a hydrogenation reaction to form a modified dicyclopentadiene diamine. The method of nitration and hydrogenation of the dicyclopentadiene phenol resin is not particularly limited, for example, known nitration and hydrogenation methods may be used, which will not be repeated here. Next, the modified dicyclopentadiene diamine and maleic anhydride are condensed and polymerized to form the second resin.

The second resin may have a structure represented by the following formula (1). In this embodiment, the weight average molecular weight of the second resin may be 800 to 10,000, preferably 1,000 to 4,000.

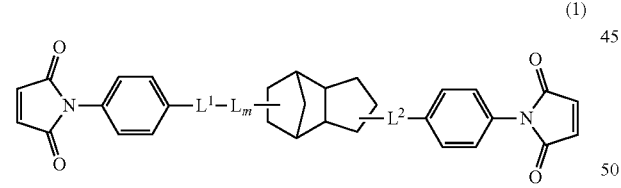

(1)

In formula (1), L represents a dicyclopentadienyl group, a divalent organic group derived from a phenolic compound or a combination thereof, preferably a combination of a dicyclopentadienyl group and a divalent organic group derived from a phenolic compound, and the divalent organic group is preferably a divalent organic group including a maleimide group;

L$^1$ and L$^2$ each represent a divalent organic group derived from a phenolic compound; and m represents an integer of 0 to 18, preferably 2 to 10.

L, L$^1$ and L$^2$ may represent divalent organic groups derived from phenol. In this embodiment, L may represent

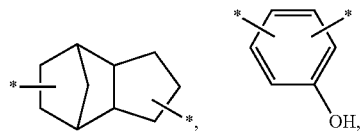

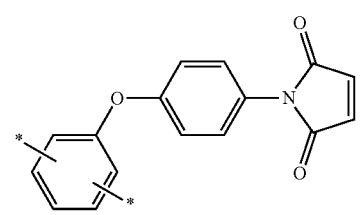

or a combination thereof, preferably a combination of

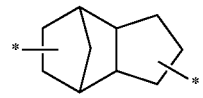

and

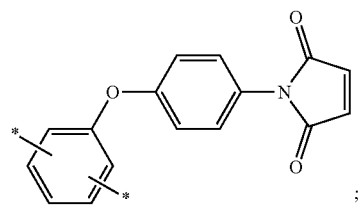

;

* means the bonding position; L$^1$ and L$^2$ may each represent

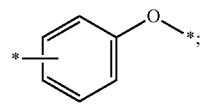

;

* represents the bonding position.

In this embodiment, the second resin may have a structure represented by the following formula (2). In this embodiment, the second resin may be a modified multi-maleimide resin.

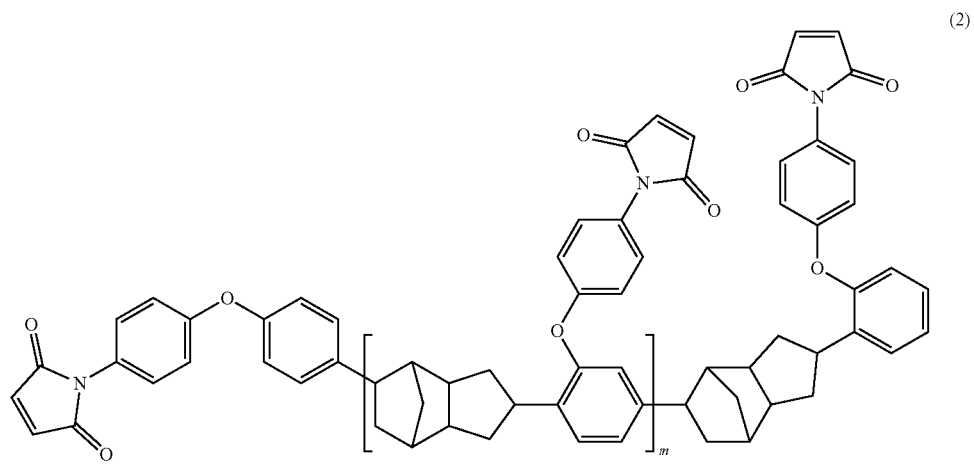

(2)

In formula (2), m represents an integer of 0 to 18, preferably 2 to 10.

SBS Resin

In this embodiment, the SBS resin refers to styrene-butadiene-styrene block copolymer (SBS), and the SBS resin may be polymerized by a monomer mixture including 5% to 40% styrene, 55% to 90% 1,2 butadiene and 5% to 30% 1,4 butadiene. The SBS resin may have the weight average molecular weight of 3500 to 5500. Based on the total weight of the resin mixture, the content of the SBS resin may be 10 wt % to 30 wt %. SBS resin may improve the phase separation between resins, improve fluidity and filling properties, thereby enhancing overall processability while maintaining low dielectric constant properties.

Polyphenylene Ether Resin

In some embodiments, the resin mixture of the disclosure may further include polyphenylene ether resin. The polyphenylene ether resin may be a thermosetting polyphenylene ether resin having at least one modified group. The modified group may be selected from a group consisting of hydroxyl group, amine group, vinyl group, styryl group, methacrylate group, epoxy group and a combination thereof. Based on the total weight of the resin mixture, the polyphenylene ether resin may be added in an amount of, for example, 0 wt % to 20 wt %.

Specific examples of the polyphenylene ether resin include, but are not limited to, for example, MX90 (modified groups at both ends are hydroxyl groups) or MX9000 (modified groups at both ends are methacrylate groups) (available from Saudi Basic Industries Corporation (SABIC)), or OPE-2St (the modified groups at both ends are styrene groups), OPE-2EA (the modified groups at both ends are methacrylate groups) or OPE-2Gly (the modified groups at both ends are epoxy groups) (available from Mitsubishi Gas Chemical Corporation (MGC)).

Flame Retardant

In this embodiment, the flame retardant may be a phosphorus-containing flame retardant or a bromine-containing flame retardant. Specific examples of the flame retardant may include, but are not limited to, Exolit OP 935 (available from Clariant). SPB-100 (available from Otsuka Chemical). PX-200 (available from Daihachi Chemical). PQ-60 (available from purchased from Jinyi Chemical). Based on 100 parts by weight of the resin mixture, the flame retardant may be added in an amount of 10 to 50 parts by weight.

Spherical Silica

In this embodiment, the spherical silica may preferably be prepared by a synthetic method to reduce electrical properties and maintain fluidity and filling properties. The spherical silica may have acrylic or vinyl surface modification, the purity is above 99.0%, and the average particle size D50 is about 2.0 μm to 3.0 μm. Based on 100 parts by weight of the resin mixture, the spherical silica is added in an amount of, for example, 20 to 50 parts by weight.

Siloxane Coupling Agent

In this embodiment, the siloxane coupling agent may include, but not limited to, siloxane. In addition, according to the functional group, the siloxane coupling agent may be divided into amino silane compound, epoxide silane compound, vinyl silane compound, ester silane compound, hydroxyl silane compound, isocyanate silane compound, methacryloxysilane compound and acryloxysilane compound. Based on 100 parts by weight of the resin mixture, the siloxane coupling agent may be added in an amount of, for example, 0.1 to 5 parts by weight. The siloxane coupling agent may enhance the compatibility and cross-linking degree of the resin composition for glass fiber cloth and powder.

Additive

In addition to the above components, the resin composition of the disclosure may also contain other additives, such as a peroxide initiator.

It should be noted that the resin composition of the disclosure may be processed to a prepreg and/or a copper foil substrate (CCL) according to actual design requirements. Therefore, the prepreg and the copper foil substrate fabricated by the resin composition of the disclosure also have a low dielectric constant, a low dissipation factor, and a high glass transition temperature for better reliability (e.g., desired electrical properties may be maintained). In more detail, the dielectric constant of the prepreg and the copper foil substrate fabricated by the resin composition may be about 3.0 to 3.1, the dissipation factor thereof may be about 0.0015 or less, and the glass transition temperature thereof may be 200 degrees or higher. For example, the glass transition temperature thereof is about 200 degrees to about 250 degrees.

Hereinafter, the above-mentioned resin composition of the disclosure will be described in detail by means of experimental examples. However, the following experimental examples are not intended to limit the disclosure.

EXPERIMENTAL EXAMPLES

Preparation Examples: Preparation of Second Resin 1 mol of dicyclopentadiene phenol resin (trade name: ERM6140, manufactured by Matsubara Corporation, weight average molecular weight: 1,300) and 1.25 mol of 4-halonitrobenzene (halogen may be fluorine, chlorine, bromine or iodine) were added into 6 moles of dimethylacetamide (DMAC) which serves as a reaction solvent at a temperature of 120° C. for 300 minutes to carry out the nitration reaction. Then, hydrogen gas was introduced to react at a temperature of 90° C. for 480 minutes to perform a hydrogenation reaction, so as to form a modified dicyclopentadiene diamine. Next, 3 moles of maleic anhydride and 9.7 wt % of toluenesulfonic acid were added to react at a temperature of 120° C. for 420 minutes, to prepare a second resin. The second resin is a maleimide resin (such as bis(4-maleimidophenoxy-3,5-dimethylphenyl)dicyclopentadiene (DCPD-BMI)) having dicyclopentadiene structure as the main chain and having a structure represented by formula (2) (m represents an integer from 0 to 18).

$$\text{(2)}$$

Evaluation Methods

The copper foil substrates produced in Experimental examples and Comparative example were evaluated by the following methods.

"Glass transition temperature (° C.)" is tested by using a dynamic mechanical analyzer (DMA).

"Water absorption (%)" is calculated by the weight change before and after heating the sample in a pressure cooker with a temperature of 120° C. and a pressure of 2 atm for 120 minutes.

"Solder heat resistance (s) at 288° C." indicates heating the sample in a pressure cooker with a temperature of 120° C. and a pressure of 2 atm for 120 minutes, and then immersing the sample in a soldering furnace at 288° C., and recording the time required for the explosion.

"Dielectric constant Dk" is measured by using a dielectric analyzer (model: HP Agilent E4991A) to test the dielectric constant at a frequency of 10 GHz.

"Dissipation factor Df" is measured by using a dielectric analyzer (model: HP Agilent E4991A) to test the dissipation factor at a frequency of 10 GHz.

"Resin flow rate" indicates pressing the sample by a press with a temperature of 170° C. (±2.8° C.) and a pressure of 200 psi (±25 psi) for 10 minutes. After fusion and cooling, a disc is punched out, and an accurate weight of the disc is weighted, so as to calculate the outflow amount of the resin.

Resin Phase Separation (Slice Analysis)

Step 1: The copper foil substrate is cut into a size of 1 cm*1 cm, and then is put into the mold for resin grouting.

Step 2: After the resin has completely dried and hardened, the sample is grinded and polished.

Step 3: The sample is Use analyzed by a high-resolution microscope such as OM/SEM to confirm if there is resin phase separation inside the sample.

Property Evaluation

The resin compositions shown in Table 1 were respectively mixed with toluene to form a thermosetting resin composition varnish. Then, the varnish was impregnated with Nanya fiberglass cloth (Nanya Plastics Cooperation, cloth type: 1078LD) at room temperature, and then dried at 170° C. (impregnation machine) for a few minutes, to obtain a prepreg with a resin content of 79 wt %. Finally, 4 pieces of prepreg are stacked between two pieces of 35 μm thick copper foil and maintained under a pressure of 25 kg/cm² and a temperature of 85° C. for 20 minutes, then heated to 210° C. with a heating rate of 3° C./min and kept at a constant temperature for 120 minutes, and after that, slowly cooled to 130° C. to obtain a 0.59 mm thick copper foil substrate.

In Table 1, the details of each ingredient are as follows.

First resin: purchased from Denka Company, model: Poly-DVB

Second resin: the second resin obtained from the preparation example

SBS resin: purchased from Japan Soda Company, model: 1,2-SBS Type-C

Polyphenylene ether resin: purchased from Sabic Company, model: MX9000

Spherical silica: purchased from Sanshiji Company, model: EQ2410-SMC

Flame retardant: purchased from Jinyi Chemical Company, model: PQ-60

Siloxane coupling agent: purchased from Dow Corning, model: Z-6030

Peroxide: purchased from ARKEMA Company, model: Luperox F

TABLE 1

|  |  |  | Experimental Example 1 | Experimental Example 2 | Comparative Example 1 |
|---|---|---|---|---|---|
| Resin composition | Resin mixture | first resin (parts by weight) | 40 | 40 | 40 |
|  |  | second resin (parts by weight) | 20 | 40 | — |
|  |  | SBS resin (parts by weight) | 20 | 20 | 20 |
|  |  | polyphenylene ether resin (parts by weight) | 20 | — | 40 |
|  | spherical silica (parts by weight) |  | 40 | 40 | 40 |
|  | flame retardant (phr) |  | 30 | 30 | 30 |
|  | peroxide (phr) |  | 1 | 1 | 1 |
|  | siloxane coupling agent (phr) |  | 0.5 | 0.5 | 0.5 |
| B stage curing temperature (° C.) |  |  | 130 | 130 | 130 |
| Glass transition temperature (° C.) |  |  | 218 | 245 | 168 |
| Water absorption (PCT ½ hour) (%) |  |  | 0.21 | 0.25 | 0.18 |
| Heat resistance (PCT ½ hour) |  |  | OK | OK | OK |
| Water absorption (PCT 2 hours) (%) |  |  | 0.26 | 0.31 | 0.24 |
| Heat resistance (PCT 2 hours) |  |  | OK | OK | OK |
| Dielectric constant (Dk) (at a frequency of 10 GHz) |  |  | 3.05 | 3.07 | 3.01 |
| Dissipation factor (Df) (at a frequency of 10 GHz) |  |  | 0.00147 | 0.00150 | 0.00142 |
| Resin flow rate (%) |  |  | 35 | 33 | 38 |
| Resin Phase Separation (Slice Analysis) |  |  | No resin phase separation | No resin phase separation | No resin phase separation |

It may be seen from the above Table 1 that the copper foil substrate of Comparative Example 1 does not include a second resin polymerized by modified dicyclopentadiene diamine and maleic anhydride, so it has the disadvantage of low glass transition temperature. In comparison, the copper foil substrates of Example 1 and Example 2 use the resin composition formula of the disclosure in which the second resin is added, and thus may achieve a high glass transition temperature while maintaining a low dielectric constant and a low dissipation factor.

To sum up, the resin composition of the disclosure combines the first resin polymerized by a monomer mixture including styrene, divinylbenzene and ethylene, the second resin polymerized by modified dicyclopentadiene diamine and maleic anhydride and the SBS resin, to achieve a high glass transition temperature, a low dielectric constant and a low dissipation factor.

What is claimed is:

1. A resin composition, comprising:
   a resin mixture, comprising:
     a first resin, polymerized by a monomer mixture comprising styrene, divinylbenzene, and ethylene;
     a second resin, polymerized by modified dicyclopentadiene diamine and maleic anhydride; and
     a SBS resin;
   a flame retardant;
   a spherical silica; and
   a siloxane coupling agent.

2. The resin composition of claim 1, wherein based on a total weight of the resin mixture, a content of the first resin is 30 wt % to 60 wt %, a content of the second resin is 20 wt % to 40 wt %, and a content of the SBS resin is 10 wt % to 30 wt %.

3. The resin composition of claim 1, wherein based on 100 parts by weight of the resin mixture, an added amount of the spherical silica is 20 to 50 parts by weight.

4. The resin composition of claim 1, wherein based on 100 parts by weight of the resin mixture, an added amount of the flame retardant is 10 to 50 parts by weight.

5. The resin composition of claim 1, wherein based on 100 parts by weight of the resin mixture, an added amount of the siloxane coupling agent is 0.1 to 5 parts by weight.

6. The resin composition of claim 1, wherein a molar ratio of styrene: divinylbenzene: ethylene in the monomer mixture is 1:1:1 to 2:2:1.

7. The resin composition of claim 1, wherein a number average molecular weight of the first resin is 4500 to 6500.

8. The resin composition of claim 1, wherein a weight average molecular weight of the second resin is 800 to 10,000.

9. The resin composition as claimed in claim 1, wherein the SBS resin is polymerized by the monomer mixture comprising 5% to 40% styrene, 55% to 90% 1,2 butadiene and 5% to 30% 1,4 butadiene.

10. The resin composition of claim 1, wherein a weight average molecular weight of the SBS resin is 3500 to 5500.

11. The resin composition of claim 1, wherein the resin mixture further comprises polyphenylene ether resin.

12. The resin composition of claim 1, wherein the spherical silica has acrylic or vinyl surface modification.

13. The resin composition of claim 1, wherein an average particle diameter D50 of the spherical silica is 2.0 μm to 3.0 μm.

* * * * *